United States Patent
Matsui et al.

(10) Patent No.: US 11,335,364 B1
(45) Date of Patent: May 17, 2022

(54) SECURE DATA ERASE FOR TAPE STORAGE

(71) Applicant: International Business Machines Corporation, Armonk, NY (US)

(72) Inventors: Sosuke Matsui, Tokyo (JP); Takeshi Nohta, Tsukuba (JP); Jun Tanaka, Zama (JP); Erina Tatsumi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/321,770

(22) Filed: May 17, 2021

(51) Int. Cl.
*G11B 5/008* (2006.01)
*G06F 21/62* (2013.01)

(52) U.S. Cl.
CPC .......... *G11B 5/00813* (2013.01); *G06F 21/62* (2013.01); *G06F 2221/2143* (2013.01)

(58) Field of Classification Search
None
See application file for complete search history.

(56) References Cited

U.S. PATENT DOCUMENTS

| | | | |
|---|---|---|---|
| 9,513,836 B1* | 12/2016 | Hasegawa | G06F 12/00 |
| 2006/0101084 A1* | 5/2006 | Kishi | G06F 3/0686 |
| 2012/0271993 A1* | 10/2012 | Thompson | G06F 12/0868 |
| | | | 711/111 |
| 2013/0305057 A1* | 11/2013 | Greco | G06F 21/62 |
| | | | 713/189 |
| 2014/0022663 A1* | 1/2014 | Dawson | G11B 5/09 |
| | | | 360/60 |
| 2016/0189744 A1 | 6/2016 | Iwanaga | |
| 2017/0344280 A1 | 11/2017 | Borlick | |
| 2017/0344562 A1 | 11/2017 | Iwanaga | |
| 2020/0264791 A1 | 8/2020 | Sasson | |

* cited by examiner

*Primary Examiner* — Peter Vincent Agustin
(74) *Attorney, Agent, or Firm* — Edward J. Wixted, III (57) ABSTRACT

In an approach, a processor determines that an inactive data area is present at end-of-tape (EOT) of a tape. A processor, responsive to determining that the inactive data area is present at EOT, securely erases the inactive data area that is present at EOT by overwriting data located at the inactive data area with different data.

20 Claims, 4 Drawing Sheets

SECURE DATA ERASE FOR TAPE STORAGE

BACKGROUND

The present invention relates generally to the field of tape storage management, and more particularly to securely erasing inactive regions of tape located at an end-of-tape (EOT) location prior to determining that the entire tape is to be securely erased.

Hierarchical storage management (HSM) is a data storage technique that automatically moves data between high-cost and low-cost storage media. High-speed storage devices, such as solid state drive arrays, are more expensive (per byte stored) than slower devices, such as hard disk drives, optical drives, and magnetic tape.

Magnetic tape data storage is a system for storing digital information on magnetic tape using digital recording. Tape data storage is more frequently used for system backup, data archive, and data exchange. The low cost of tape makes it viable for long-term storage and archiving data. Tape storage mediums may be append-only, such that new data is always appended to the tail end of the tap and updated or deleted data areas are managed as inactive areas.

SUMMARY

According to one embodiment of the present invention, a computer-implemented method, computer program product, and computer system are provided. A processor determines that an inactive data area is present at end-of-tape (EOT) of a tape. A processor, responsive to determining that the inactive data area is present at EOT, securely erases the inactive data area that is present at EOT by overwriting data located at the inactive data area with different data.

DETAILED DESCRIPTION

Embodiments of the present invention recognize that, due to increased capacity of tape storage, it can take several hours to overwrite a tape with randomized data, from beginning to end, in order to prevent improper or accidental access of data that occupies inactive areas of the tape. Embodiments recognize that a long wait time to be able to reuse tape due to such a delay in randomizing the data is undesirable. Embodiments recognize that, while some approaches utilized encrypted tapes and prevent access to data by removing a decryption key from a server managing such a key, such an approach relies on particular software/hardware to manage encryption of the tape and is inapplicable to unencrypted tape mediums. Embodiments of the present invention describe an approach for reducing the time required for securely erasing a tape (e.g., overwriting the tape with randomized data) by adding randomized data to inactive areas that that are located at end-of-tape (EOT) before the tape is empty (e.g., active areas of the tape are still present). Embodiments of the present invention are operable with unencrypted tape.

Figure 1:
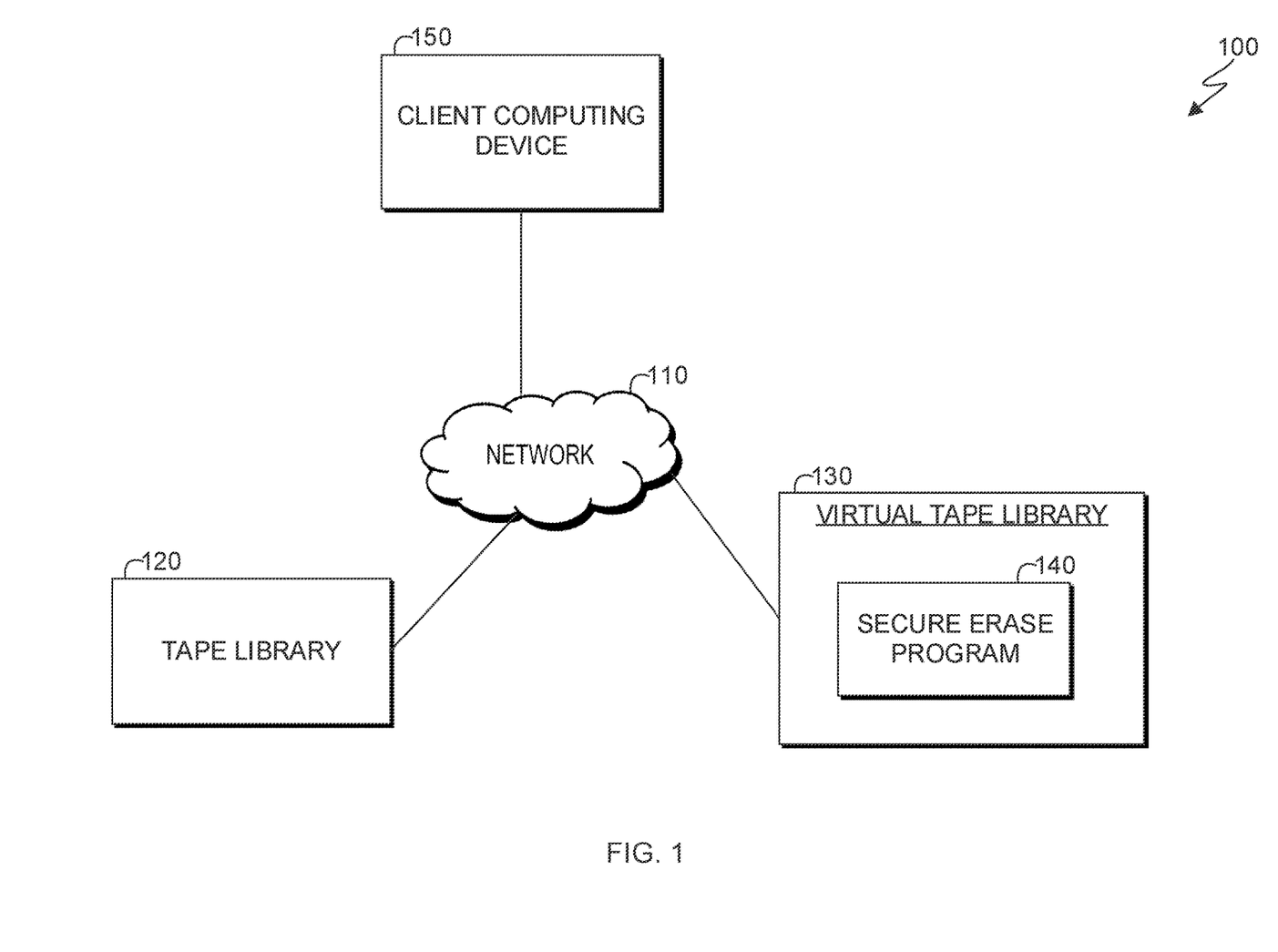
FIG. 1 is a functional block diagram illustrating a computer environment, in accordance with an embodiment of the present invention.

The present invention will now be described in detail with reference to the Figures. FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by one skilled in the art without departing from the scope of embodiments of the present invention as recited by the claims.

In the depicted embodiment, computing environment 100 includes tape library 120, virtual tape library 130, and client computing device 150 interconnected to network 110. Network 110 may be a local area network (LAN), a wide area network (WAN), such as the Internet, the public switched telephone network (PSTN), any combination thereof, or any combination of connections and protocols that will support communications between client computing device 150, virtual tape library 130, and/or tape library 120, in accordance with embodiments of the present invention. Computing environment 100 may include additional servers, computing devices, or other devices not shown.

Virtual tape library 130 may be, for example, a server computer system, such as a database management server, a management server, database server, a web server, a structured query language server, or any other electronic device of computing system capable of sending and receiving data. In one embodiment, virtual tape library 130 may be a mainframe virtual tape solution. In one embodiment, virtual tape library 130 may write data to physical tape storage utilizing high performance tape drives installed in a tape library, such as tape library 120. In one embodiment, virtual tape library 130 may provide a tiered storage hierarchy of disk and tape storage. In some embodiments, virtual tape library 130 may be a data center consisting of a collection of networks and servers providing an information technology (IT) service, such as virtual servers and applications deployed on virtual servers, to an external party. In some embodiments, virtual tape library 130 may be a database server operating on a legacy system, such as a mainframe system. In other embodiments, virtual tape library 130 represents a cloud of computing devices interconnected by one or more networks, where virtual tape library 130 is a computing system utilizing clustered computers and components to act as a single pool of seamless resources when accessed via network 110. In some embodiments, virtual tape library 130 includes secure erase program 140. Virtual tape library 130 may include components, as depicted and described in further detail with respect to FIG. 4.

Tape library 120 is a tape storage library interconnected with a virtual tape library, such as virtual tape library 130. In general, tape library 120 provides the capability to store data through the user of an integrated tape drive and one or more physical tapes. In one embodiment, tape library 120 represents a plurality of interconnected physical tape libraries.

Secure erase program 140 operates to securely erase data located at inactive areas located at the end-of-tape (EOT) location of a tape medium. In general, secure erase program erases the data by overwriting the data with randomized data such that the data previously located at such locations cannot be accidentally or improperly read. Secure erase program 140 marks inactive areas located at the EOT location as securely erased such that less of the tape needs to be securely erased when secure erase program 140 determines that the entire tape should be erased. In one embodiment, secure erase program 140 resides on virtual tape library 130. In other embodiments, secure erase program 140 may reside on another server or another computing device, provided that secure erase program 140 can communicate with tape library 120 and virtual tape library 130.

Client computing device 150 may be, for example, a server, a desktop computer, a laptop computer, a tablet computer, a smartphone, or any other electronic device or computing system capable of communicating with virtual tape library 130 via network 110. In some embodiments, client computing device 150 may be any suitable type of client device capable of submitting one or more read or write requests to a data tape management server, such as virtual tape library 130. In some embodiments, client computing device 150 includes a user interface (not shown) for submitting data requests to a data tape management server, such as virtual tape library 130. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels or text navigation.

Figure 2:
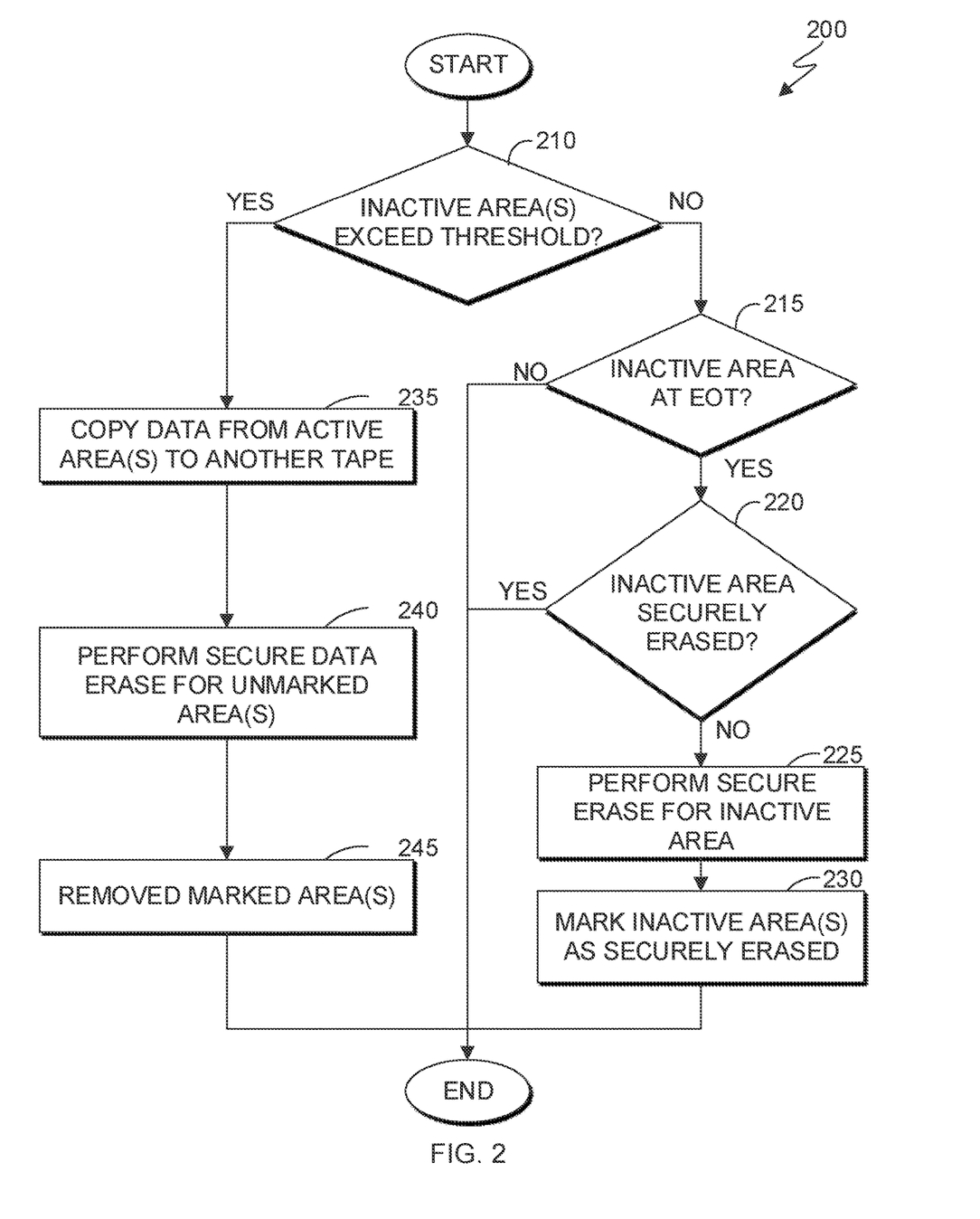
FIG. 2 is a flowchart depicting operational steps of secure erase program, executing within the computer environment of FIG. 1, for securely erasing inactive areas of tape, in accordance with an embodiment of the present invention.

FIG. 2 depicts a flowchart 200 for the steps of secure erase program 140, executing within computing environment 100 of FIG. 1, for expediting the secure erasure of data on tape by, when idle, securely erasing data that exists at EOT of tape and, upon determining that the amount of active data on the tape is below a threshold, moving active data to another tape and subsequently securely erasing the rest of the tape (e.g., the areas of the tape not previously erased as a result of inactive areas existing at EOT).

In one embodiment, initially, a host at client computing device 150 may interact with virtual tape library 130 to cause data to be stored to tape on tape library 120. Typically, virtual tape library 130 may include primary storage, such as disks, and archived data or backup data to the primary storage may be stored on tape at tape library 120. Tape library 120 may be an append-only storage medium where new data is always appended to the tail end of the tape and areas corresponding to data that has been deleted or updated are managed as inactive areas. However, inactive areas still generally include the data and, thus, can accidentally or improperly be read. As date or files are updated, the original data locations are marked as inactive and the newly updated data or files are added to the tail end of the tape. Accordingly, the tape may include active areas that corresponds to data or files that are currently active and inactive areas corresponding to data or files that have been deleted or updated. The host may specify a capacity threshold. The capacity threshold may correspond to a percentage of total capacity of the tape that is inactive. In other words, when a tape has been written on from BOT to EOT, over time, active data may be deleted or updated and create inactive areas. When the percentage of inactive areas exceeds the capacity threshold, secure erase program 140 determines that active data remaining on the tape is to be moved and that the tape is to be erased so that the tape may be reused.

In general, secure erase program 140 may be periodically run on each tape of tape library 120. In some embodiments, a timed schedule may be used specifying a frequency at which secure erase program should run. In other embodiments, secure erase program 140 is initiated in response to tape library 120 having one or more tape media in an idle state. In such embodiments secure erase program 140 may be able to run without interrupting any data read or write requests.

In decision 210, secure erase program 140 determines whether the inactive areas of exceed the capacity threshold. As described above, the capacity threshold may be specified by the host. In some embodiments, the capacity threshold is specified by an administrative user of tape library 120 or virtual tape library 130. Virtual tape library 130 may manage a tape directory which gives the physical tape location for a given data block number. The tape directory may also specify areas of the tape that are active and areas of the tape that are inactive. In such embodiments, secure erase program 140 accesses the tape directory to identify the percentage of areas that are inactive compared to the total storage capacity of the tape and determine whether that percentage exceeds the capacity threshold.

If secure erase program 140 determines that the inactive areas exceed the capacity threshold (decision 210, yes branch), secure erase program 140 proceeds to step 240, which is discussed below.

If secure erase program 140 determines that the inactive areas do not exceed the capacity threshold, (decision 210, no branch), secure erase program 140 determines whether any of the inactive areas are located at EOT (decision 215). Again, secure erase program 140 may consult the tape directory to identify EOT location on the tape and the data corresponding to EOT. In general, secure erase program 140 is looking to identify a consecutive portion of inactive area that starts at EOT.

If secure erase program 140 determines that the data located at EOT is active (decision 215, no branch), the program is complete.

If secure erase program 140 determines that the area of the tape located at EOT is inactive (decision 215, yes branch), secure erase program 140 identifies all of the consecutive inactive areas beginning at EOT (e.g., from EOT to the next portion of active data on the tape) and determines whether data from the inactive areas has already been securely erased (decision 220).

In decision 220, secure erase program 140 determines whether data from the inactive areas has already been securely erased. In some embodiment, secure erase program 140 marks areas as securely erased when a secure data erase has been performed for the particular area (see steps 235 and 250). Accordingly, if secure erase program 140 has run multiple iterations, it is possible that secure erase program 140 has already previously performed a secure erase of the data. Secure erase program 140 may access the tape directory to determine whether the inactive areas at EOT have already been securely erased.

If secure erase program 140 determines that the data from the inactive areas has already been securely erased (decision 220, yes branch), the program is complete.

If secure erase program 140 determines that the data form the inactive areas has not yet been securely erased (decision 220, no branch), secure erase program 140 performs a secure data erase for the inactive areas that consecutively exist between EOT and an active area of the tape (step 225).

In step 225, secure erase program 140 performs a secure data erase for the inactive areas that consecutively exist between EOT and an active area of the tape. As generally described above, inactive data is not actually deleted and may be accidentally or impermissibly read. "Erasing" of the data, as described herein, is actually overwriting with, for example, randomized data and/or, in general, different data such that the original data is no longer present and unable to be accessed. Accordingly, secure erase program 140 overwrites the data present in the above described EOT inactive areas such that the originally present data is unreadable. Due to tape characteristics, inactive areas in the middle of the tape cannot be overwritten without causing subsequent active areas of the tape to become inaccessible. As such, in step 225, secure erase program 140 only overwrites data in the are that is inactive from a starting point to EOT.

In step 230, secure erase program 140 marks the identified inactive areas located at EOT as securely erased. Secure erase program 140 may record this information in, for example, the tape directory. In other embodiments, secure erase program 140 may record this information at another location accessible by secure erase program 140. Subsequent to marking the inactive areas, the program is complete.

In step 235, subsequent to secure erase program 140 determining that the inactive areas of the tape exceed a capacity threshold of the tape, secure erase program 140 copies active data located in that active areas of the tape to a second tape medium. As described above, virtual tape library 130 may maintain a tape directory and secure erase program 140 may access to tape directory to determine the physical tape locations for active files/data and copy the active files/data to a second tape.

In step 240, secure erase program 140 performs a secure data erase for unmarked areas of the tape. As described above, secure erase program 140 marks previously erased inactive areas consecutively connected to EOT and, as such, does not need to perform a secure data erase for those areas. Accordingly, secure erase program 140 may be able to save time once a determination is made to erase all of the data on the tape because a portion of the tape may not need to be erased as said portion was previously erased. This may allow the tape to be erased more quickly and reused as a new tape more efficiently than traditional processes would allow. In general, secure erase program 140 will need to perform a secure data erase from beginning-of-tape (BOT) until the marked areas on the tape. Secure erase program 140 may access the tape directory or other location where secure erase program 140 recorded the information indicating inactive areas that have already been securely erased to determine areas of the tape that require secure data erasure.

In step 245, secure erase program 140 marks all areas of the tape as not securely erased or, depending on the embodiment, merely removes any of the markings that indicate that inactive areas have been securely erased. Secure erase program 140 removes such markings because, after performing the secure data erase at step 240, the tape is now considered an empty tape that is ready to be reused. Upon removing the markings and designating the tape as an empty tape that is ready to be reused, the program is complete.

Figure 3:
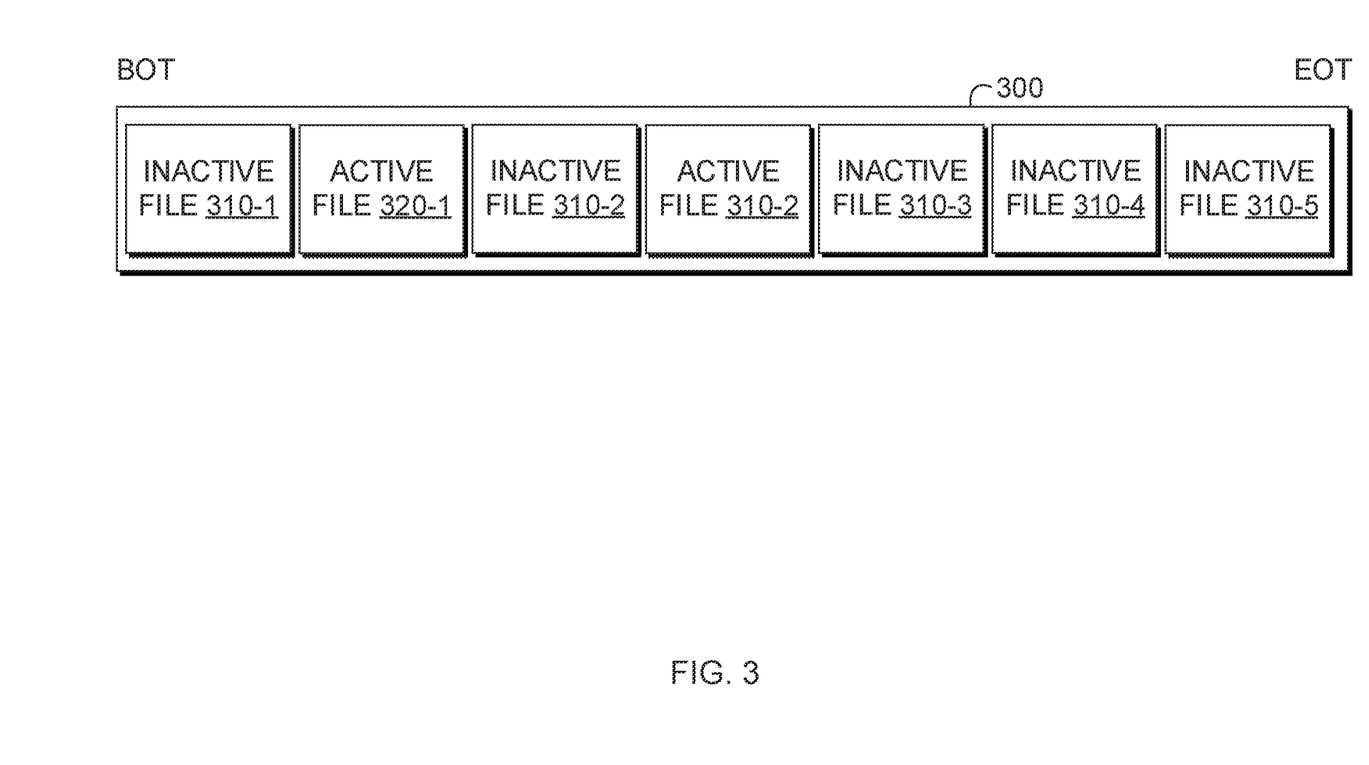
FIG. 3 illustrates an example tape that includes inactive and active files, in accordance with an embodiment of the present invention.

FIG. 3 depicts example tape 300 that includes inactive files 310 and active files 320. While the files in tape 300 are depicted as being equal in size, it should be noted that this is merely for ease of depiction and the may actually be different sizes. As depicted, secure erase program 140 would only because able to securely erase inactive files 310-3, 310-4, and 310-5 as these are the only files that are inactive data existing in an inactive area consecutively located at a location on the tape at EOT. Inactive file 310-1 is located at BOT and inactive file 310-2 is located between active files 320-1 and 320-2.

Accordingly, in embodiments of the present invention, if secure erase program 140 determines that the inactive areas do not exceed the capacity threshold, secure erase program 140 would perform a secure data erase of the areas of the tape corresponding to inactive files 310-3, 310-4, and 310-5 and record that these inactive areas have been securely erased. Once the capacity threshold was exceeded, secure erase program 140 would copy active files 320 to another tape and perform a secure data erase of the areas of the tape corresponding to files 310-1, 320-1, 310-2, and 320-2. However, as they were already securely erased, secure erase program 140 would not need to perform another secure data erase of the areas corresponding to the areas of the tape corresponding to inactive files 310-3, 310-4, and 310-5.

Figure 4:
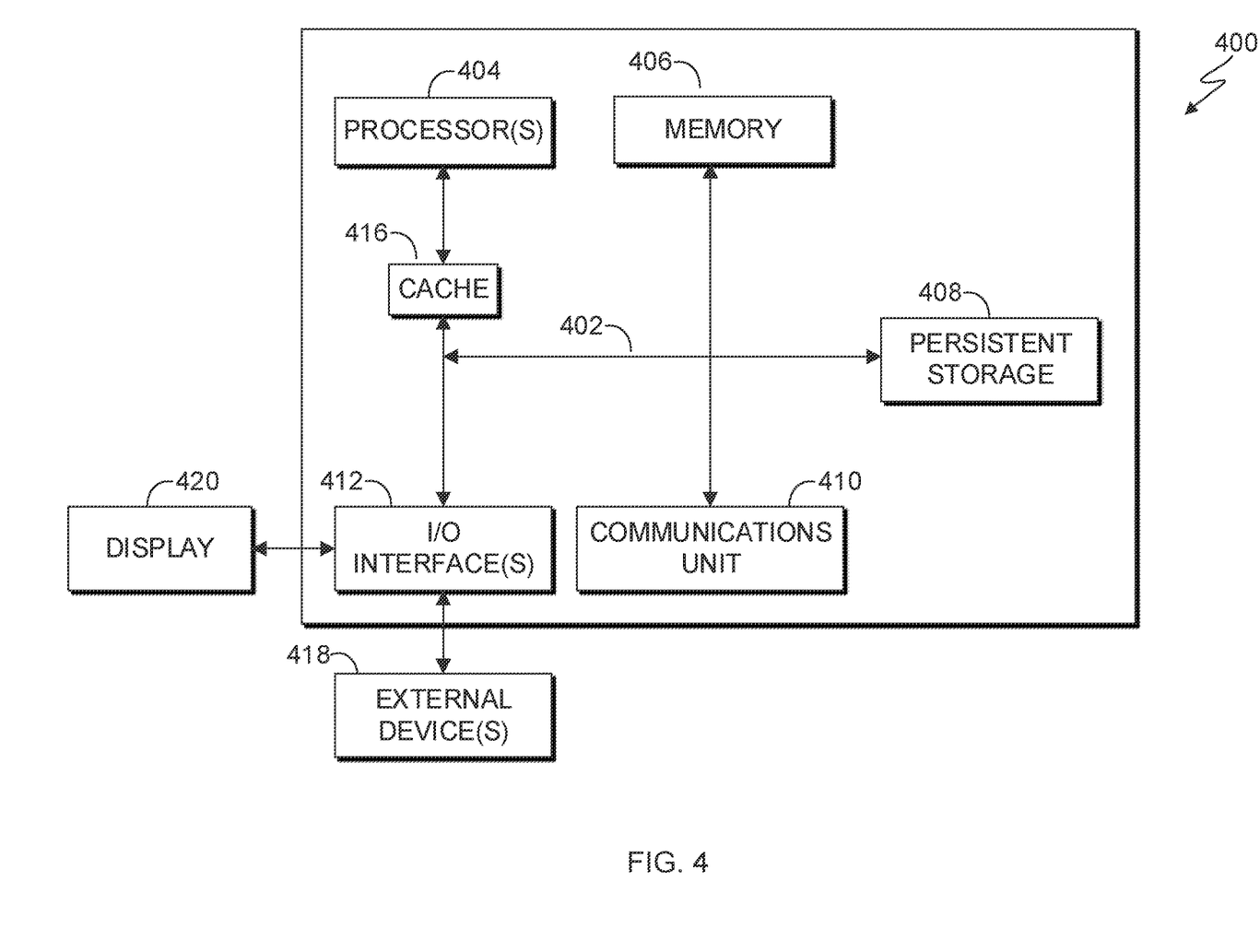
FIG. 4 is a block diagram of components of the client computing device, tape library, and virtual tape library of FIG. 1, in accordance with an embodiment of the present invention.

FIG. 4 depicts a block diagram of components of tape library 120, virtual tape library 130, and client computing device 150 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Tape library 120, Virtual tape library 130, and client computing device 150 may each include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Secure erase program 140 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Secure erase program 140 may be downloaded to persistent storage 408 through communications unit 410.

I/O interface(s) 412 allows for input and output of data with other devices that may be connected to tape library 120, virtual tape library 130, and/or client computing device 150. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., secure erase program 140, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
determining, by one or more processors, that an inactive data area is present at end-of-tape (EOT) of a tape; and
responsive to determining that the inactive data area is present at EOT, securely erasing, by one or more processors, the inactive data area that is present at EOT by overwriting data located at the inactive data area with different data, wherein subsequent to overwriting the data located at the inactive data area with the different data, the inactive data area remains inactive.

2. The computer-implemented method of claim 1, further comprising:
determining, by one or more processors, that inactive data areas of the tape are below a capacity threshold; and
wherein determining that the inactive data area is present at EOT of the tape is responsive to determining that the inactive data areas of the tape are below the capacity threshold.

3. The computer-implemented method of claim 1, further comprising:
recording, by one or more processors, the inactive data area that is present at EOT as securely erased.

4. The computer-implemented method of claim 3, further comprising:
determining, by one or more processors, that inactive data areas of the tape exceed a capacity threshold; and
responsive to determining that the inactive data areas of the tape exceed a capacity threshold:
copying, by one or more processors, data from one or more active areas of the tape to a second tape; and
securely erasing, by one or more processors, areas of the tape not recorded as securely erased.

5. The computer-implemented method of claim 4, further comprising:
responsive to securely erasing the areas of the tape not recorded as securely erased:
removing, by one or more processors, securely erased records for the tape; and
identifying, by one or more processors, the tape as an empty tape.

6. The computer-implemented method of claim 1, further comprising:
determining, by one or more processors, that the inactive data area has not been recorded as securely erased; and
wherein securely erasing the inactive data area that is present at EOT is further responsive to determining that the inactive data area has not been recorded as securely erased.

7. The computer-implemented method of claim 1, further comprising:
determining, by one or more processors, that the tape is in an idle state; and
wherein determining that the inactive data area is present at EOT of the tape is responsive to determining that the tape is in the idle state.

8. A computer program product comprising:
one or more computer readable storage media, and program instructions collectively stored on the one or more computer readable storage media, the program instructions comprising:
program instructions to determine that an inactive data area is present at end-of-tape (EOT) of a tape; and
program instructions to, responsive to determining that the inactive data area is present at EOT, securely erase the inactive data area that is present at EOT by overwriting data located at the inactive data area with different data, wherein subsequent to overwriting the data located at the inactive data area with the different data, the inactive data area remains inactive.

9. The computer program product of claim 8, further comprising:
program instructions, collectively stored on the one or more computer readable storage media, to determine that inactive data areas of the tape are below a capacity threshold; and
wherein program instructions to determine that the inactive data area is present at EOT of the tape are responsive to determining that the inactive data areas of the tape are below the capacity threshold.

10. The computer program product of claim 8, further comprising:
program instructions, collectively stored on the one or more computer readable storage media, to record the inactive data area that is present at EOT as securely erased.

11. The computer program product of claim 10, further comprising:
program instructions, collectively stored on the one or more computer readable storage media, to determine, that inactive data areas of the tape exceed a capacity threshold; and
program instructions, collectively stored on the one or more computer readable storage media, to, responsive to determining that the inactive data areas of the tape exceed a capacity threshold:
copy data from one or more active areas of the tape to a second tape; and
securely erasing areas of the tape not recorded as securely erased.

12. The computer program product of claim 11, further comprising:

program instructions, collectively stored on the one or more computer readable storage media, to, responsive to securely erasing the areas of the tape not recorded as securely erased:
  remove securely erased records for the tape; and
  identify the tape as an empty tape.

13. The computer program product of claim 8, further comprising:
program instructions, collectively stored on the one or more computer readable storage media, to determine that the inactive data area has not been recorded as securely erased; and
wherein program instructions to securely erase the inactive data area that is present at EOT are further responsive to determining that the inactive data area has not been recorded as securely erased.

14. The computer program product of claim 8, further comprising:
program instructions, collectively stored on the one or more computer readable storage media, to determine, that the tape is in an idle state; and
wherein program instructions to determine that the inactive data area is present at EOT of the tape are responsive to determining that the tape is in the idle state.

15. A computer system comprising:
one or more computer processors, one or more computer readable storage media, and program instructions collectively stored on the one or more computer readable storage media for execution by at least one of the one or more computer processors, the program instructions comprising:
program instructions to determine that an inactive data area is present at end-of-tape (EOT) of a tape; and
program instructions to, responsive to determining that the inactive data area is present at EOT, securely erase the inactive data area that is present at EOT by overwriting data located at the inactive data area with different data, wherein subsequent to overwriting the data located at the inactive data area with the different data, the inactive data area remains inactive.

16. The computer system of claim 15, further comprising:
program instructions, collectively stored on the one or more computer readable storage media for execution by at least one of the one or more computer processors, to determine that inactive data areas of the tape are below a capacity threshold; and
wherein program instructions to determine that the inactive data area is present at EOT of the tape are responsive to determining that the inactive data areas of the tape are below the capacity threshold.

17. The computer system of claim 15, further comprising:
program instructions, collectively stored on the one or more computer readable storage media for execution by at least one of the one or more computer processors, to record the inactive data area that is present at EOT as securely erased.

18. The computer system of claim 17, further comprising:
program instructions, collectively stored on the one or more computer readable storage media for execution by at least one of the one or more computer processors, to determine, that inactive data areas of the tape exceed a capacity threshold; and
program instructions, collectively stored on the one or more computer readable storage media for execution by at least one of the one or more computer processors, to, responsive to determining that the inactive data areas of the tape exceed a capacity threshold:
  copy data from one or more active areas of the tape to a second tape; and
  securely erasing areas of the tape not recorded as securely erased.

19. The computer system of claim 18, further comprising:
program instructions, collectively stored on the one or more computer readable storage media for execution by at least one of the one or more computer processors, to, responsive to securely erasing the areas of the tape not recorded as securely erased:
  remove securely erased records for the tape; and
  identify the tape as an empty tape.

20. The computer system of claim 15, further comprising:
program instructions, collectively stored on the one or more computer readable storage media for execution by at least one of the one or more computer processors, to determine that the inactive data area has not been recorded as securely erased; and
wherein program instructions to securely erase the inactive data area that is present at EOT are further responsive to determining that the inactive data area has not been recorded as securely erased.

* * * * *